UNITED STATES PATENT OFFICE 1,982,154

PROCESS OF PREPARING ACETIC ANHYDRIDE

Alfred Dierichs, Leverkusen-on-the-Rhine, and Leonhard Weiss, Wiesdorf, Germany, assignors to I. G. Farbenindustrie Aktiengesellschaft, Frankfort-on-the-Main, Germany, a corporation of Germany No Drawing. Application February 9, 1931, Serial No. 514,692. In Germany August 1, 1929

12 Claims. (Cl. 260—123)

The present invention relates to the manufacture of acetic anhydride by the catalytic decomposition of acetic acid.

It is known that acetic anhydride can be manufactured by leading acetic acid vapors over or through a catalyst containing phosphoric acid compounds as for instance molten phosphates, especially a molten mixture of sodium and lithium meta phosphate at temperatures between 500° C. and 1000° C. The reaction being an endothermic one the addition of heat is necessary.

According to the present invention molten metal phosphates are used as catalysts and the heat necessary for carrying out the reaction is supplied by using the molten catalyst as a resistance in an electric circuit. A simple method of carrying out the invention is to use the vessel containing the molten catalyst as one electrode and the tube by which the acetic acid vapors are introduced as the other electrode. The vessel and inlet tube are prepared from substances conducting an electric current, for instance metals, alloys, coal, graphite, carborundum, chamotte-graphite and similar materials.

Any metal phosphate or mixture of metal phosphates may be used with or without boron phosphate and/or boric acid anhydride. Examples of suitable metal phosphates are the alkali metal phosphates and especially heavy metal phosphates and also mixtures of heavy metal phosphates with boron-phosphate and boric acid anhydride. For instance, sodium-, lithium-, lead- and zinc-meta-phosphates can be used as catalysts; also mixtures of lead-meta-phosphate with boron-phosphate or mixtures of zinc- and lead-meta-phosphate or mixtures of heavy metal phosphates and earth alkali metal phosphates, such as calcium and also aluminium or magnesium phosphate can be used in admixture with boric acid anhydride with or without the addition of boron-phosphate.

The metal phosphates other than the alkali metal phosphates possess substantially the same efficacy as the alkali metal phosphates, but offer a higher specific resistance to the passage of the electric current and thus exhibit distinct advantages. Thus, for instance, a higher electrical potential can be applied and, consequently, the process is highly improved.

It is evident that the metal phosphates other than the alkali metal phosphates, for instance, the heavy metal phosphates, can also be applied in mixture with the alkali metal phosphates.

The present process has the advantage over all other processes used up to date, wherein the heat required is supplied from the outside by means of gas, oil or electrical heating or by a process in which the vessel containing the molten catalyst is used as resistance, that the heat is generated at the same spot where it is used for performing the reaction, a saving of heat resulting therefrom. Also, attack of the material of the vessel at high temperatures, which results when heating from the outside, is avoided to a far reaching extent.

The invention is illustrated by the following examples without being restricted thereto:

Example 1.—Into a copper crucible of 60 mm. diameter containing a molten mixture of equal parts (400 grams each of sodium meta phosphate and lithium meta phosphate) is introduced acetic acid vapor, the temperature of the melt being 640° C., by means of a copper inlet tube having a diameter of 20 mm. The tube reaches 25 mm. into the melt. The copper inlet tube is one electrode and the copper crucible the other electrode, the circuit having a voltage of 9.6 volts alternating current and the internal current being about 150 amperes. The yield of anhydride, containing only traces of phosphoric acid and organic compounds of phosphorus is 50–60% of the theoretical.

Example 2.—Into a crucible of chromium nickel steel of the Krupp A. G. (V4A), see German Patents Nos. 304,126; 304,159; 395,044; 399,806, of 160 mm. diameter containing a molten mixture of 1 part by weight of sodium meta phosphate, 1 part by weight of lithium meta phosphate and 1 part by weight of borylphosphate (boronphosphate $B_2O_3.P_2O_5$) is introduced. Into the melt having a temperature of about 700–750° C., acetic acid vapor having a temperature of about 620° C. is introduced by means of an inlet tube made of V4A-steel dipping 50 mm. into the molten catalyst. Inlet tube and crucible form the electrodes. Alternating current is used, the voltage being 28–35 volts at 100–150 amperes. The yield and purity of the acetic anhydride produced are equal to the yield and purity of the product of Example 1. The addition of boronphosphate not only prolongs the life period of the catalyst but also raises the specific resistance of the melt. As a result a higher amperage can be used.

The scope of the invention is illustrated by comparison of the specific resistances given in the following table:—

| Catalysts | Specific resistance at 750° C. measured in ohms |
|---|---|
| Sodium metaphosphate | 2.1 |
| Sodium lithium metaphosphate | 2.3 |
| Sodium lithium metaphosphate with the addition of 30% boron phosphate | 4.6 |
| Sodium lithium metaphosphate with the addition of 30% boric acid anhydride | 5.2 |
| Sodium lithium metaphosphate with the addition of 30% boron phosphate and 5% ferric phosphate | 5.8 |
| Lead metaphosphate (according to manufacture) | 7.2–33 |
| Zinc metaphosphate (according to manufacture) | 10.4–130 |
| 1 part of boron phosphate and 4 parts of lead metaphosphate | 19 |

The present application is a continuation in part application of our application Serial No. 466,573, filed July 8, 1930 in which the use of a molten catalyst comprising an alkali-metal phosphate is claimed.

We claim:—

1. Process of preparing acetic acid anhydride by the catalytic decomposition of acetic acid vapor, which comprises conducting said acetic acid vapor through a molten catalyst comprising a metal phosphate, which catalyst is arranged as a resistance in an electric circuit and thus maintained at a temperature of between 500 and 1000° C. by means of an electric current.

2. Process of preparing acetic acid anhydride by the catalytic decomposition of acetic acid vapor, which comprises conducting said acetic acid vapor through a molten catalyst comprising a metal phosphate and boron phosphate, which catalyst is arranged as a resistance in an electric circuit and thus maintained at a temperature of between 500 and 1000° C. by means of an electric current.

3. Process of preparing acetic acid anhydride by the catalytic decomposition of acetic acid vapor, which comprises conducting said acetic acid vapor through a molten catalyst comprising a metal phosphate, boron phosphate and boric acid anhydride, which catalyst is arranged as a resistance in an electric circuit and thus maintained at a temperature of between 500 and 1000° C. by means of an electric current.

4. Process of preparing acetic acid anhydride by the catalytic decomposition of acetic acid vapor, which comprises conducting said acetic acid vapor through a molten catalyst comprising a heavy metal phosphate, which catalyst is arranged as a resistance in an electric circuit and thus maintained at a temperature of between 500 and 1000° C. by means of an electric circuit.

5. Process of preparing acetic acid anhydride by the catalytic decomposition of acetic acid vapor, which comprises conducting said acetic acid vapor through a molten catalyst comprising a heavy metal phosphate and boron phosphate, which catalyst is arranged as a resistance in an electric circuit and thus maintained at a temperature of between 500 and 1000° C. by means of an electric current.

6. Process of preparing acetic acid anhydride by the catalytic decomposition of acetic acid vapor, which comprises conducting said acetic acid vapor through a molten catalyst comprising a heavy metal phosphate, boron phosphate and boric acid anhydride, which catalyst is arranged as a resistance in an electric circuit and thus maintained at a temperature of between 500 and 1000° C. by means of an electric current.

7. Process of preparing acetic acid anhydride by the catalytic decomposition of acetic acid vapor, which comprises conducting said acetic acid vapor through a molten catalyst comprising a heavy metal phosphate and an alkali metal phosphate, which catalyst is arranged as a resistance in an electric circuit and thus maintained at a temperature of between 500 and 1000° C. by means of an electric current.

8. Process of preparing acetic acid anhydride by the catalytic decomposition of acetic acid vapor, which comprises conducting said acetic acid vapor through a molten catalyst comprising a heavy metal phosphate, an alkali metal phosphate and boron phosphate, which catalyst is arranged as a resistance in an electric circuit and thus maintained at a temperature of between 500 and 1000° C. by means of an electric current.

9. Process of preparing acetic acid anhydride by the catalytic decomposition of acetic acid vapor, which comprises conducting said acetic acid vapor through a molten catalyst comprising a heavy metal phosphate, an alkali metal phosphate, boron phosphate and boric acid anhydride, which catalyst is arranged as a resistance in an electric circuit and thus maintained at a temperature of between 500 and 1000° C. by means of an electric current.

10. Process of preparing acetic acid anhydride by the catalytic decomposition of acetic acid vapor, which comprises conducting said acetic acid vapor through a molten catalyst comprising lead-meta phosphate, which catalyst is arranged as a resistance in an electric circuit and thus maintained at a temperature of between 500 and 1000° C. by means of an electric current.

11. Process of preparing acetic acid anhydride by the catalytic decomposition of acetic acid vapor, which comprises conducting said acetic acid vapor through a molten catalyst comprising zinc-meta phosphate, which catalyst is arranged as a resistance in an electric circuit and thus maintained at a temperature of between 500 and 1000° C. by means of an electric current.

12. Process of preparing acetic acid anhydride by the catalytic decomposition of acetic acid vapor, which comprises conducting said acetic acid vapor through a molten catalyst comprising lead-meta phosphate and boron phosphate, which catalyst is arranged as a resistance in an electric circuit and thus maintained at a temperature of between 500 and 1000° C. by means of an electric current.

ALFRED DIERICHS.
LEONHARD WEISS.